United States Patent [19]

Hahn

[11] E Patent Number: Re. 32,754

[45] Reissued Date of Patent: Sep. 27, 1988

[54] TABLE TOP GRILL

[75] Inventor: Linus K. Hahn, Palo Alto, Calif.

[73] Assignee: Columbia Industries Corporation, San Mateo, Calif.

[21] Appl. No.: 860,668

[22] Filed: May 7, 1986

Related U.S. Patent Documents

Reissue of:

[64] Patent No.: 4,446,846
Issued: May 8, 1984
Appl. No.: 441,497
Filed: Nov. 15, 1982

[51] Int. Cl.[4] ..... A47J 37/00

[52] U.S. Cl. ..... 126/25 R; 126/38; 126/41 R; 99/447

[58] Field of Search ..... 99/447, 448, 449, 450; 126/9 R, 25 R, 30, 38, 41 R

[56] References Cited

U.S. PATENT DOCUMENTS

| | | | |
|---|---|---|---|
| 752,426 | 2/1904 | Stewart et al. | 126/38 |
| 1,384,250 | 7/1921 | Froom | 126/30 |
| 1,518,713 | 12/1924 | Trow | 126/38 |
| 1,714,264 | 5/1929 | Goldberg et al. | 126/38 |
| 2,522,223 | 9/1950 | Hardin et al. | 126/30 X |
| 2,898,846 | 1/1959 | Del Francia | 99/443 |
| 3,295,509 | 1/1967 | Harvey | 126/25 R |
| 3,379,190 | 3/1968 | Leach | 126/25 R |
| 3,430,621 | 1/1969 | Doty | 126/25 R |
| 3,763,846 | 10/1973 | Schantz | 126/41 R |
| 3,789,822 | 2/1974 | Schantz | 126/41 R |
| 3,791,368 | 2/1974 | Hunt | 126/25 A |
| 3,851,639 | 12/1974 | Beddoe | 126/25 R |
| 3,938,494 | 2/1976 | Clark | 126/25 R |
| 4,135,874 | 1/1979 | Tsuzi et al. | 431/115 |
| 4,334,462 | 6/1982 | Hefling | 99/385 |

*Primary Examiner*—Samuel Scott
*Assistant Examiner*—Allen J. Flanigan
*Attorney, Agent, or Firm*—Limbach, Limbach & Sutton

[57] ABSTRACT

An improved table top grill which includes a modular fire grate configuration for holding heat retention material in a predetermined area, the fire grate configuration being easily removeable from the grill. Two sets of fire grate modules are provided along with a heating grate so that a dual-purpose grill is obtained, wherein both a grilling operation and a pot or pan cooking operation can be conducted simultaneously.

24 Claims, 4 Drawing Sheets

TABLE TOP GRILL

Matter enclosed in heavy brackets [ ] appears in the original patent but forms no part of this reissue specification; matter printed in italics indicates the additions made by reissue.

DESCRIPTION

1. Technical Field

The present invention is directed generally to gas grills, and more particularly, to an improved table top gas grill.

2. Background Art

Conventional table top grills comprise a grill housing, a gas burner disposed at the bottom of the housing, a singular fire grate, lava rock or preformed briquettes positioned upon the fire grate, and a cooking grid disposed above the lava rocks or preformed briquettes. The gas supply and regulator valve for the gas burner are located external to the housing. These conventional grills may or may not have a dual burner.

There are a number of disadvantages with this typical configuration of the conventional table top grill. One of these is the location of the gas regulator and valves external to the housing of the grill. With the valves in such a position, care must be taken in shielding the valves from sharp blows, or rough handling in general.

Another disadvantage is that such a grill has essentially one primary use, that of grilling food in connection with heated lava rocks or preformed briquettes. The cooking grill, fire grate and burner are all positioned with respect to one another in these grills to provide the optimum heat transfer between gas burner and briquette and then between briquette and food being cooked. As such, other cooking operations, such as pan frying or boiling of water in a pot cannot be accomplished with optimum efficiency since these operations require positioning the pot or pan within the gas flame.

If it were desired to set up the conventional table top grills for pan-frying, water boiling, or the like, the optimum configuration would require the removal of the cooking grill, as well as the removal of all of the lava rocks so that the pot or pan could be positioned directly on the fire grate. In such a configuration, the table top grill could only be used in the pan-frying or water boiling applications. In other words, the table top grill then would not be optimally configured for grilling. It is clear from the discussion above, that table top grills presently available do not afford a dual-purpose cooking function, and that although with such grill configurations the ability to pan fry or boil water can be provided by conventional table top grills, this is accomplished only upon sacrificing the ability to grill food.

SUMMARY OF THE INVENTION

The foregoing and other problems of conventional table top grills are overcome by the present invention of an improved table top grill in which lava rock or the like, are heated and the food to be cooked is positioned in close proximity thereto. The table top grill comprises a housing; means for heating the lava rock or like material, wherein the heating means are positioned within the housing; support means positioned above the heating means within the housing for supporting cooking utensils which in turn contain the objects to be cooked in direct communication with the heating means; fire grate means positioned within the housing and above the support means for supporting the lava rock or like material, the fire grate means including first and second tray means; and first and second cooking grate means positioned above the first and second tray means.

In the present invention, control valves for the heating means are located internal to the housing. A heat shield is included between the heating means and the valves to reflect heat away from the valves.

A plurality of sets of ribs are positioned within the housing to provide support for the support means, the fire grate means, and the cooking grate means, and to wedge the cooking grate means against the fire grate means when the grill is in transit.

The result of such configuration is that the fire grate and cooking grid, along with the lava rock or like material, are configured as two modules, each of which can be separately removed from the table top grill. Because the fire grate and cooking grates are supplied in two sections, thus providing for two modules of fire grate means, lava rock or like material, and cooking grid means, a dual purpose table top grill can be obtained. Thus, in operation, at least one module can be removed thus providing a position on the heating grid for placing a pan or pot in direct communication with the heating means, with a second position available in connection with the remaining fire grate, lava rock material, and cooking grid for the conventional grilling operation.

It is, therefore, an object of the present invention to provide a dual-purpose table top grill wherein grilling and pan-frying or the like operations can be conducted simultaneously.

It is a further object of the present invention to provide a table top grill wherein a portion of the fire grate and lava rock or like material can be easily removed so that both a grilling operation and a pan-frying or the like operation can be conducted simultaneously.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
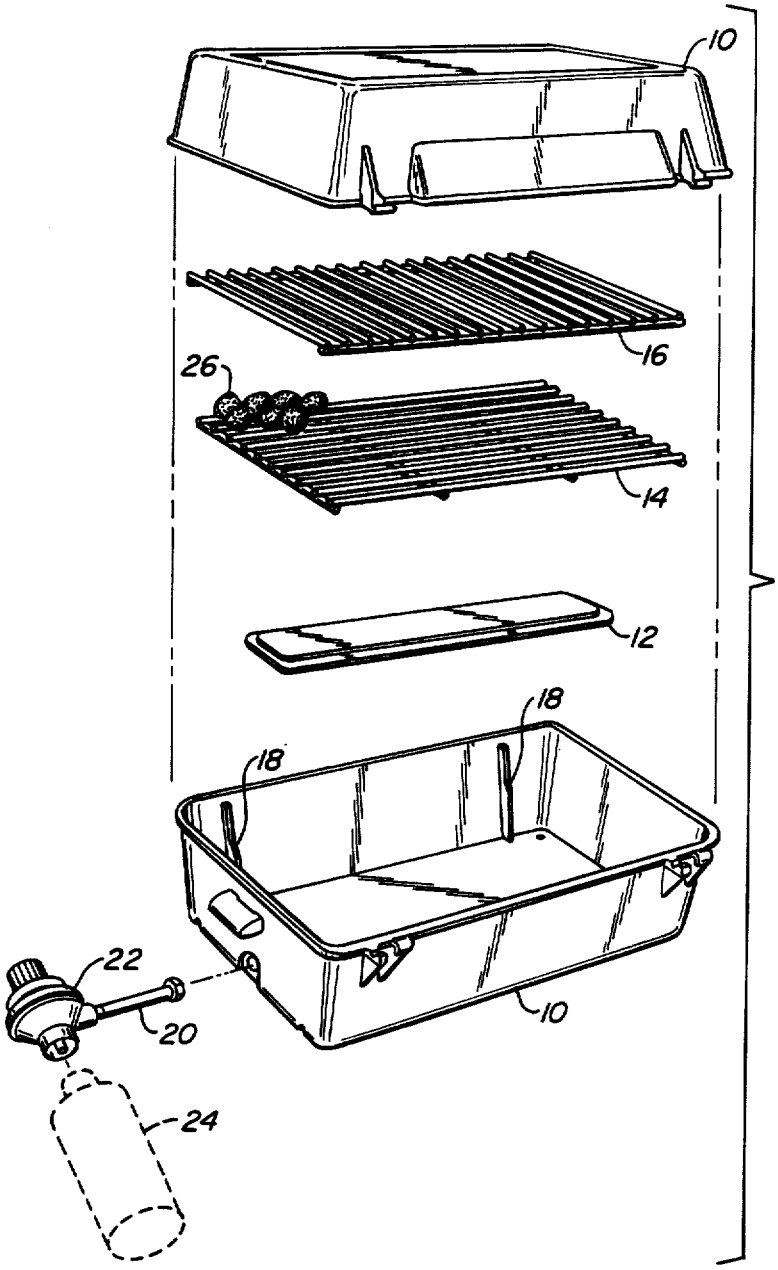
FIG. 1. (PRIOR ART)
FIG. 1 illustrates a conventional table top grill.

FIG. 1 illustrates the typical table top grill. As can be seen from the drawing, a housing 10 supports a burner 12, a fire grate 14, and a cooking grate 16, all disposed above one another. Flanges 18 disposed on the side walls of housing 10 support the fire grate 14 and the cooking grid 16 with respect to one another. As can be seen from FIG. 1, fire grate 14 and cooking grid 16 are each a unitary body, each of which rests freely upon flanges 18 within housing 10. Lava rock or preformed briquettes 26 are disposed loosely upon fire grate 14 between cooking grid 16 and fire grate 14. The fuel for burner 12 is supplied via tubing 20, valve 22 and gas cylinder 24, all of which are disposed at the exterior of the housing 10.

It can be seen from FIG. 1 that the configuration shown therein is suitable for use in a grilling mode wherein the food to be cooked is placed upon cooking grid 16 in close proximity to the lava rock or like material 26 disposed on fire grate 14. If a pot of water or pan for frying eggs were desired to be heated by this conventional grill configuration, there would be an inefficient transfer of heat between burner 12 and the pot or pan disposed upon cooking grid 16, due to the interposed lava rock or like material 26. Likewise, if the pot or pan were desired to be positioned closer to burner 12, cooking grid 16 would have to be removed, in addition to the lava rock or like material 26. Thus, in such a modified configuration, no grilling could occur concurrently with the pan-frying or water-boiling operation. Additionally, the exterior location of valve 22 dictates that certain precautions must be taken in transporting this grill to avoid impact upon valve 22.

Figure 2:
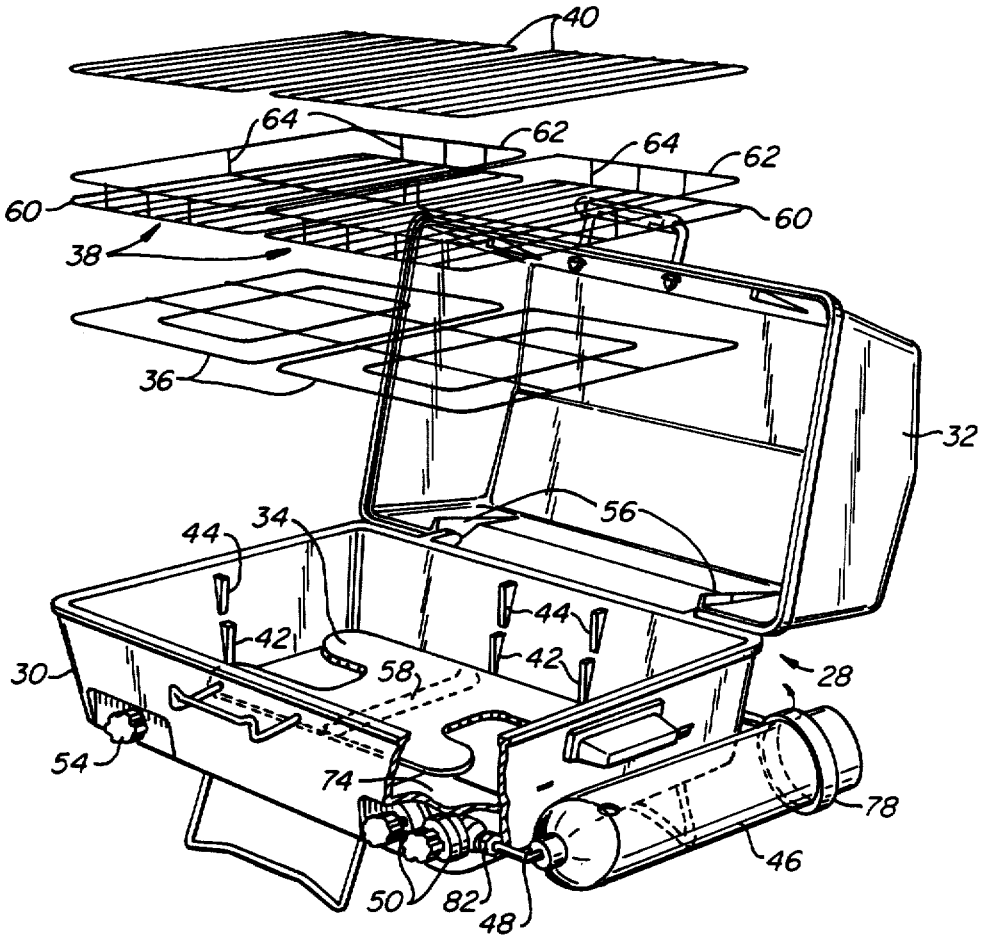
FIG. 2 is a perspective, exploded view of the grill of the present invention.

FIG. 2 illustrates an exploded view of the present invention. The housing 28 includes a base 30 and a lid 32 which is pivotally attached to base 30 on one side. Positioned at the bottom of base 30 is a gas burner 34. Positioned above the gas burner 34 and within base 30 are a pair of heating grates 36 or flame grates. Positioned above the heating grates 36 and within base 30 are a pair of fire grates 38. Positioned above fire grates 38 and within base 30 are a pair of cooking grids 40. The pair of heating grates 36 are supported by a set of ribs 42 which are positioned on the side walls of base 30. The pair of fire grates 38 are supported above the burner 34 by the pair of heating grates 36. The pair of cooking grates 40 are supported above the pair of fire grates 38 by a set of ribs 44 which are positioned under side walls of base 30.

Fuel is supplied to burner 34 from an external reservoir 46 via conduit 48 and conventional valves 50. The gas flowing out of burner 34 is ignited by way of a conventional piezo electric ignition element (not shown), the nob of which is referenced by numeral 54 in FIG. 2.

Lid 32 has a set of ribs 56 which abut against the top of cooking grids 40 when lid 32 is closed over base 30. The abutting action of ribs 56 against cooking grids 40 holds the grids tightly against the tops of fire grates 38.

From FIG. 2, it can be seen that burner 34 is preferably "H" shaped with a partition 58 bisecting its center. This "H" shape provides a more even distribution of flame, with respect to the heating grates 36 and fire grates 38, than an "I" shape burner. The partition serves as a heat divider to reduce the amount of heat which flows from one side of the burner 34 to the other, so that more precise control of the heat level generated for a particular burner side can be more closely regulated. Each side of burner 34 is independently controlled by valves 50.

The purpose of heating grate 36 is to provide support for a cooking utensil in close proximity and in direct contact with the flames which emerge from burner 34. As is well-known in the cooking art, optimum heat transfer between a flame and a pot or pan is achieved when the pot or pan is positioned in close proximity to the flame. Thus, heating grates 36 provide support for pots or pan in a position of optimal heat transfer for that type of cooking operation. Preferably, heating grates 36 are constructed of rectangular loops of wire which are concentric with each other and disposed in a common plane. These loops of wire are fastened to one another by lengths of wire which are disposed transversely across the concentric loops.

Remaining with FIG. 2, it can be seen that fire grates 38 are each constructed of a planar grid of wire 60. Disposed above the periphery of the planar grids 60 is a rectangular loop of wire 62. The distance between the loop of wire and the planar grids 60, as well as the distance between the wires in the planar grid 60 are chosen to be less than the minimum size of the lava rock or preformed briquette material 26 which are to be contained within fire grates 38. Rails 62 are connected to planar grids 60 by vertical posts 64 which extend between the periphery of planar grid 60 and rails 62. These rails 62 form side walls to enclose the lava rock or like material 26 within the confines of the planar grids 60.

The fire grates 60 are, in one embodiment, trays which retain the preformed briquettes, lava rocks, or the like in a predefined area.

The fire grates 38 are supported by heating grates 36. Thus, the lava rock or preformed briquette materials are supported in close proximity to the flame from burner 34. Optimum heat transfer between the flame from burner 34 and the lava rock or preformed briquette material is thus obtained.

Cooking grates 40 are also formed as planar wire grids. As can be seen from FIG. 2, the periphery of cooking grid 40 is selected to match the surface area defined by rails 62. In this manner, cooking grid 40 acts as cover for fire grates 38. As discussed above, when lid 32 is closed upon base 30, ribs 56 of lid 32 are caused to abut against cooking grid 40. This forces cooking grid 40 securely against rail 62 to fully confine the preformed briquette or lava rock material 26 within fire grates 38, even when the grill is being transported.

Figure 3:
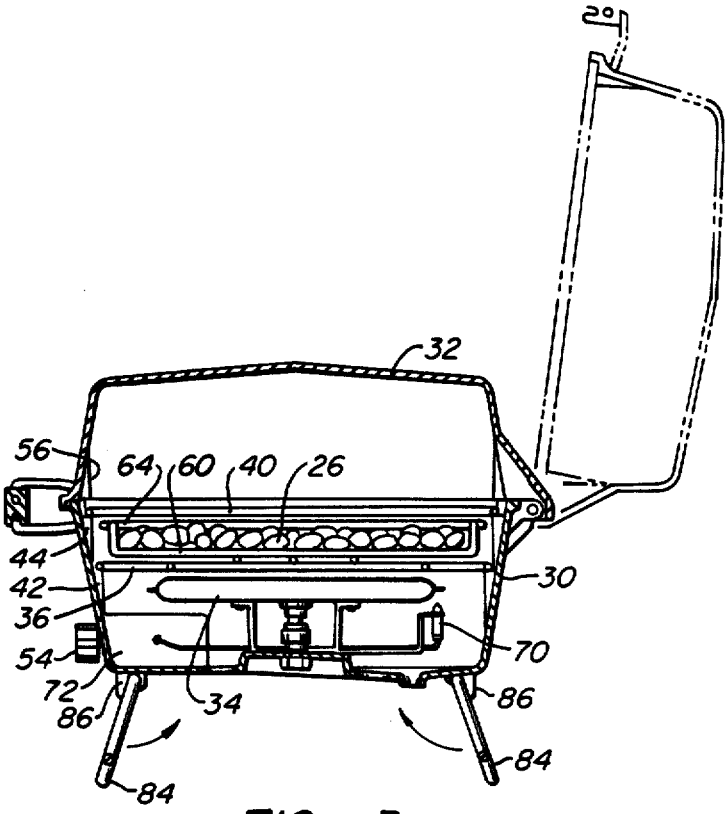
FIG. 3 is a side ways, cut-away view of the grill of the present invention.

The position or relationship between the various grates and grids, as well as the burner, can be seen more clearly in FIG. 3. In this figure, the lid 32 is shown closed upon base 30. Thus, it can be seen that heating grid 36 is disposed directly above burner 34 and that fire grate 60, which includes lava rocks or preformed briquette material 26 is positioned above and supported by heating grid 36. Directly above the rail 64 of fire grate 60 is positioned cooking grid 40. Ribs 56 are shown abutted against the top of cooking grid 40. By the configuration of the present invention as described above, a dual-purpose table top grill is obtained. By virtue of the configuration of the fire grate 38 and cooking grid 40, the preformed briquette or lava rocks along with one of the fire grates 38 and cooking grids 40 can be removed independently from the other set of grids and grates and with great ease. Upon such a removal, heating grate 36 remains which provides support for a pot or a pan in a position which is optimum for heat transfer between the gas burner and the pan.

Because the other set of cooking grid, fire grate, and lava rock or preformed briquette is independently removable, a very flexible grill configuration is obtained.

Additionally, the preformed briquettes or lava rocks are held securely in place by the modules formed by fire grates 60 and cooking grids 40. Thus, the problem of the preformed briquettes or lava rocks falling into the burner area, as well as the requirement for repositioning the briquettes or lava rocks after the grill is transported, is overcome.

As discussed above, the configuration of the various elements of the present invention permit a dual-purpose table top grill capable of grilling food, as well as use in pan-frying or boiling water simultaneously. The combination of cooking grids 40 and fire grates 38 provide a convenient container for the lava rock or preformed briquette material. In such a manner, the grill can be easily converted for use from one entirely suited for grilling to one in which grilling and pan-frying or water-boiling can take place simultaneously. The provision of dual fire grates and cooking grids provides a simple and secure way of quickly converting between cooking modes. By virture of this dual-purpose configuration, the heat supplied by burner 34 can be used to its optimum efficiency.

The gas supplied from burner 34 is ignited by way of ignition electrode 70 shown positioned beneath burner 34 and FIG. 3. Ignition electro 70 is supplied with a high voltage pulse from a piezo electric material (not shown) located in compartment 72 beneath burner 34. Knob 54 is connected to a piezo electric material. The piezo electric material, when stressed by a rotating or linear impact, produces the high voltage pulse which is converted into a spark by ignition electrode 70. Compartments 72 comprises a heat shield which is disposed between burner 34 and the piezo electric material so as to prevent overheating of the piezo electric material.

As discussed above, burner 34 is supplied with fuel from a reservoir 46 which is located external to housing 28. Conventional valves 50 are located on the inside of base 30 beneath burner 34. A heat shield 74 is provided to deflect heat coming from burner 34 away from the valves 50. See FIG. 4. By positioning valves 50 within the housing 28, the resulting grill configuration is capable of withstanding a greater amount of impact and, as a result, less care is required in transporting the grill. As can be seen from FIGS. 2 and 4, heat shield 74 can be formed as an integral part of housing 30. Preferably, heat shield 74 surrounds valves 50 completely so that any radiant or convective heat from burner 34 is intercepted by heat shield 74 and conducted away to housing 30. Vent holes 73 can be added to heat shield 74 and the housing 30, in the area of the valves 50, to encourage air circulation about the valves 50 to keep them cool.

Figure 4:
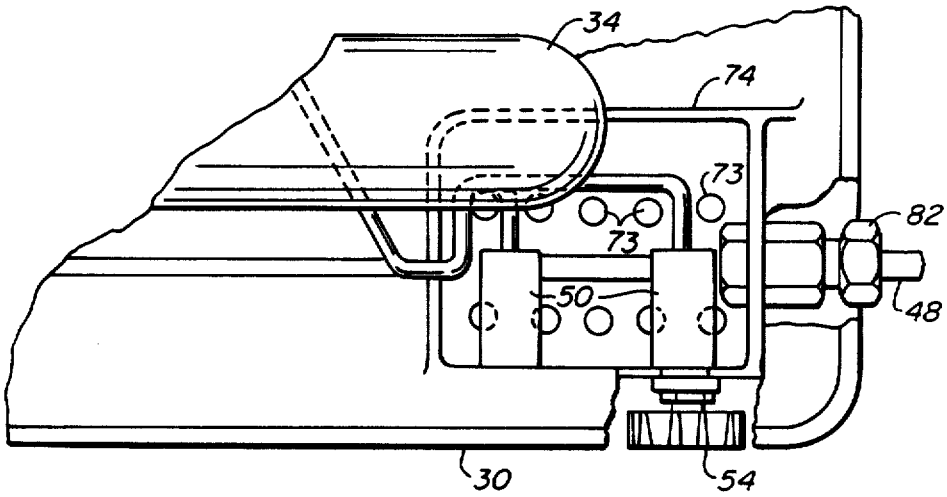
FIG. 4 is a cut away view of the valves and heat shield shown position in the interior of the housing.
Figure 5:
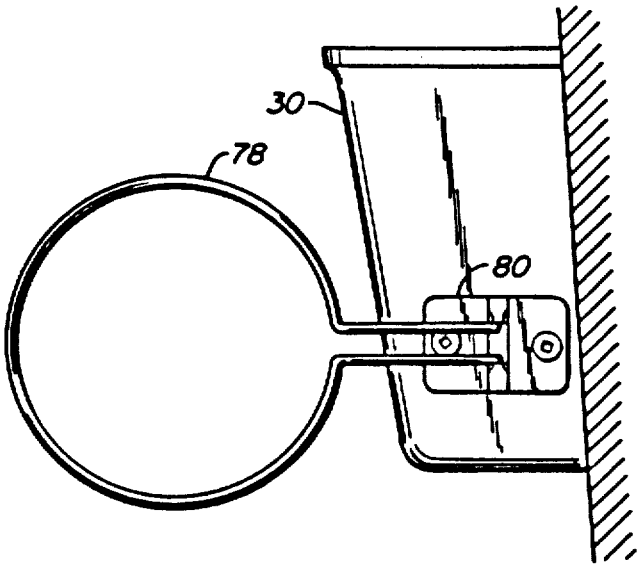
FIG. 5 illustrates the positioning of pivotting ring support on the rear of the housing.

In the typical application, the fuel reservoir 46 takes the form of a cylindrical gas bottle 76 shown in FIG. 2. The present invention further provides a pivotting ring support 78 having a ring portion with a diameter selected so that one end of the gas cylinder fits within the ring portion. When the gas bottle is connected to the grill, conduit 48 supports one end of the gas bottle, while arm 78 supports the other end of the gas bottle. When the gas bottle is removed, arm 78 is pivotted about bracket 80, see FIG. 5, so that it folds against the back wall of base 10. Conduit 48 connects to base 30 via a connector 82, as is illustrated in FIG. 4. When the gas bottle 46 is sought to be removed from the housing, connector 82 can be inscrewed. Thus, there is no protruding conduit protruding conduit portion associated with the fuel supply of the gas grill. Thus, there are no protruding appendages to damage when the grill is being transported.

The grill housing 28 is supported upon a table top by way of foldable legs 84. These legs are pivotably secured to housing 28 by way of brackets 86. These brackets permit the legs 84 to be folded against the base 30 when the grill is being transported.

Figure 6:
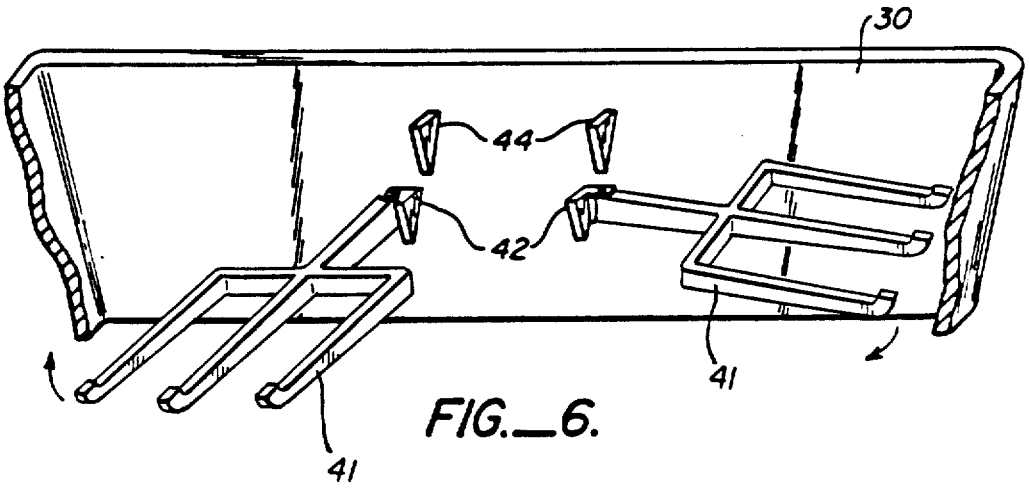
FIG. 6 is a depiction of the foldable arms for supporting cooking utensils in direct communication with the heat source.

A further variation on the heating grates 36, discussed above, is the provision of pivotting elongated arms 41 in place of the rectangular wire of loops. See FIG. 6. These foldable arms can be pivottably attached to the side walls of base 30 and swung out over the burner area when it was desired to cook using a pot or pan. During a grilling operation on cooking grate 40, these arms would be swung back against the wall and out of the way. Preferably, these arms would each have three-prongs disposed in a horizontal plane directly above burner 34 and there would be included a pair of three-pronged arms, one for each half of the grill. In FIG. 6 it can be seen that these arms 41 can be pivottably secured to ribs 42. Each arm 41 can be swung out and over burner 34 independently of the other, thus, one side of the grill can have a cooking grid 40 and fire grate 60 arrangement for grilling operations, while the other side can be set up for utensil-type cooking operations with the associated foldable arm 41 providing the required utensil support.

The terms and expressions which have been employed here are used as terms of description, and not of limitation, and there is no intention in the use of such terms and expressions of excluding equivalents of the features shown and described, or portions thereof, it being recognized that various modifications are possible within the scope of the invention claimed.

I claim:

1. A table top grill of the type in which objects to be cooked are positioned in close proximity to heated heat retention material, comprising (a) a housing;

(b) means for heating the heat retention material, the heating means being positioned within the housing;

(c) support means positioned within the housing and directly above the heating means for supporting cooking utensils in direct communication with the heating means;

(d) fire grate means positioned within the housing and above the support means for supporting the heat retention material in direct communication with the heating means including (i) first tray means removeably positioned above one section of the support means for supporting one portion of the heat retention material;

(ii) second tray means positioned above the remaining portion of the support means for retaining the remaining part of the heat retention material;

(e) first and second cooking grid means positioned within the housing and above the fire grate means for providing a cooking surface which is in close proximity to the heat retention material, wherein the first cooking grid means is disposed above the first tray means and the second cooking grid means is disposed above the second tray means and futherwherein the combination of the first tray means and the first cooking grid means can be removed from the housing independently of the second tray means and second cooking grid means combination so that the cooking surface which is in direct communication with the heating means can be provided simultaneously with the cooking surface which is in close proximity to the heat retention material.

2. The apparatus of claim 1, wherein the heat retention materials are selected from the group of materials including lava rock and preformed briquettes.

3. The apparatus of claim 1, wherein the support means comprise a first section and a second section, each section being independently supported within the housing and individually [removeable] *removable* from the housing.

4. The apparatus of claim 1, wherein the heating means is a gas burner.

5. The apparatus of claim 1, wherein the heating means is a gas burner and furtherwherein the gas burner is supplied with fuel from a fuel bottle which is disposed at the exterior of the base portion of the housing, the housing further including gas conduit means for supporting one end of the gas bottle and for providing communication between the gas bottle and the gas burner, and support arm means for supporting the other end of the gas bottle, the support arm means including a ring portion having an inner diameter substantially equal to the outer diameter of the gas bottle and arm means for pivotably coupling the ring portion to the base portion of the housing.

6. The apparatus of claim 5, further including valve means for controlling the communication along the gas conduit means, the valve means being positioned within the housing and beneath the gas burner; and heat shield means positioned between the gas burner and the valve means for reflecting heat from the gas burner away from the valve means.

7. The apparatus of claim 1, wherein the support means comprise first and second elongate arms, each arm being independently and pivottably supported at one end within the housing for movement between a first and a second position, wherein each arm is deposed against the housing in the first position and wherein each arm is positioned over the heating means, in close proximity to the heating means, in the second position.

8. The apparatus of claim 7, wherein each elongate arm further includes a multiple-pronged support member disposed at the free end thereof, the multiple-pronged support member comprising a plurality of prongs which are positioned in a common plane.

9. The apparatus of claim 6, wherein the heat shield means is formed as an integral part of the housing.

10. The apparatus of claim 6, wherein the heat shield means conducts heat to the housing.

11. The apparatus of claim 9, wherein the heat shield means include a plurality of vents for promoting the circulation of air about the valve means.

12. A table top cooking apparatus, wherein the objects to be cooked are positioned in close proximity to heated heat retention material, comprising (a) a housing;

(b) a gas burner positioned within the housing;

(c) a plurality of multipronged arms, each being pivottably secured at one end to the housing for movement between a first and a second position, so that in the first position each arm is positioned against the housing, and in the second position each arm is positioned over the gas burner;

(d) first and second fire grate means, [removeably] *removably* supported within the housing and *lying* within a common plane [about] *containing* the plurality of multipronged arms, for supporting the heat retention material in close proximity to the gas burner; and (e) first and second cooking grid means, removeably supported within the housing, the first and second cooking grids being associated with the first and second fire grate means, respectively, for supporting the objects to be cooked in close proximity to the heat retention material, and furtherwherein the objects to be cooked can be supported by ones of the plurality of multipronged arms in close proximity to a portion of the gas burner, when the cooking grid means and fire means associated with that portion of the gas burner are removed from the housing.

*13. A table top grill of the type in which objects are cooked, comprising*

*(a) a housing;*

*(b) heat retention material, wherein heat held in the heat retention material is capable of cooking the objects;*

*(c) means for heating the heat retention material, the heating means being positioned within the housing;*

*(d) support means positioned within and mounted to the housing and directly above the heating means for supporting cooking utensils in direct communication with the heating means, wherein the support means defines a horizontal plane;*

*(e) a removable grill module positioned within the housing and above the support means, wherein the grill module resides entirely above the horizontal plane of the support means, the grill module including*

*(i) tray means positioned adjacent to the heating means upon which is located said heat retention material in direct communication with the heating means; and*

*(ii) cooking grid means positioned above the tray means for providing a cooking surface which is in close proximity to the heat retention material, wherein the grill module can be removed from the housing so as to permit the support means to receive a cooking utensil.*

*14. The table top grill of claim 13, wherein the heat retention materials are selected from the group of materials including lava rock and preformed briquettes.*

*15. The table top grill of claim 13, wherein the support means comprise a first section and a second section, each section being independently supported within the housing and individually removable from the housing.*

*16. The table top grill of claim 13, wherein the heating means is a gas burner.*

*17. The table top grill of claim 13, wherein the heating means is a gas burner and furtherwherein the gas burner is supplied with fuel from a fuel bottle which is disposed at the exterior of the base portion of the housing, the housing further including gas conduit means for supporting one end of the gas bottle and for providing communication between the gas bottle and the gas burner, and support arm means for supporting the other end of the gas bottle, the support arm means including a ring portion having an inner diameter substantially equal to the outer diameter of the gas bottle and arm means for pivotably coupling the ring portion to the base portion of the housing.*

*18. The table top grill of claim 17, further including valve means for controlling the communication along the gas conduit means, the valve means being positioned within the housing and beneath the gas burner; and heat shield means positioned between the gas burner and the valve means for reflecting heat from the gas burner away from the valve means.*

*19. The table top grill of claim 13, wherein the support means comprise first and second elongate arms, each arm*

*being independently and pivotably supported at one end within the housing for movement between a first and a second position, wherein each arm is deposed against the housing in the first position and wherein each arm is positioned over the heating means, in close proximity to the heating means, in the second position.*

*20. The table top grill of claim 19, wherein each elongate arm further includes a multiple-pronged support member disposed at the free end thereof, the multiple-pronged support member comprising a plurality of prongs which are positioned in a common plane.*

*21. The table top grill of claim 18, wherein the heat shield means is formed as an integral part of the housing.*

*22. The table top grill of claim 18, wherein the heat shield means conducts heat to the housing.*

*23. The table top grill of claim 21 or 22, wherein the heat shield means include a plurality of vents for promoting the circulation of air about the valve means.*

*24. A table top cooking apparatus for cooking objects, comprising*

*(a) a housing;*

*(b) heat retention material;*

*(c) a gas burner positioned within the housing;*

*(d) a plurality of multipronged arms, each being pivotably secured at one end to the housing for movement between a first and a second position, so that in the first position each arm is positioned against the housing, and in the second position each arm is positioned over the gas burner;*

*(e) fire grate means, removably supported within the housing and lying within a common plane containing the plurality of multipronged arms, for supporting the heat retention material in close proximity to the gas burner; and*

*(f) cooking grid means, removably supported within the housing, the cooking grid means being associated with the fire grate means for supporting the objects to be cooked in close proximity to the heat retention material in direct communication with the heating means, and furtherwherein the objects to be cooked can be supported by one of the plurality of multipronged arms in close proximity to a portion of the gas burner, when the cooking grid means and fire grate means associated with that portion of the gas burner are removed from the housing.*

* * * * *